2,806,404

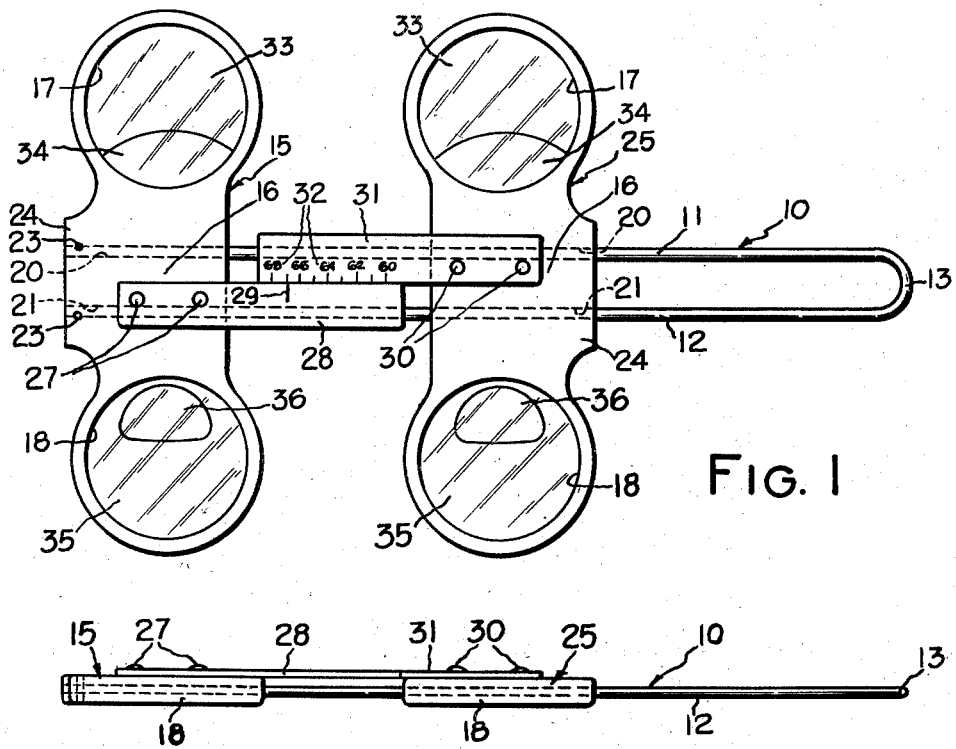

OPHTHALMIC LENS DEMONSTRATOR

Raymond F. E. Stegeman, Greece, N. Y., assignor to Bausch & Lomb Optical Company, Rochester, N. Y., a corporation of New York Application April 15, 1955, Serial No. 501,696

2 Claims. (Cl. 88—20)

This invention relates to ophthalmic devices and more particularly it has reference to a device for demonstrating different pairs of lenses.

In order to demonstrate to a patient the optical characteristics of different lenses, for instance, the near vision and far vision portions of a pair of bifocal lenses, it is necessary to resort either to a system for holding the lenses in individual pairs before the eyes of the patient or to a system for mounting two pairs of lenses onto a rod in such a way that different pairs of lenses can be selectively positioned before the eyes of patients with various interpupillary distances. The prior systems, although essentially sound, are either extremely inconvenient or are needlessly complicated and expensive, making their use impractical.

It is, therefore, an object of my invention to provide an improved lens demonstrating device that overcomes the above-noted disadvantages of the prior art.

It is another object of my invention to provide an improved lens demonstrating device that has simple means for adjusting the spacing between the lenses of each pair.

It is still another object of my invention to provide a lens demonstrating device that is simple in construction, is economically manufactured, is efficient in use, is easily operated, having but few operating parts, and is unlikely to get out of repair.

These and other objects and advantages reside in certain novel features of construction, arrangement and combination of parts as will hereinafter be more fully described and pointed out in the appended claims.

Referring to the drawing:

Fig. 1 is a front elevation of my lens demonstrating device.

Fig. 2 is a side view thereof.

A preferred embodiment of my invention is shown in the drawing wherein 10 indicates a handle or support made of stiff wire or the like bent upon itself to form a U-shaped member having two parallel side portions 11, 12 joined together at one end portion 13.

Carried by the handle 10 is a lens mount 15 which has a central portion 16 positioned between a pair of spaced apart lens rims 17 and 18. Passing through the central portion 16 and lying parallel to a plane that is perpendicular to the line connecting the centers of the lens rims 17, 18 is a pair of openings 20, 21 spaced apart a distance substantially equal to the distance between the side portions 11, 12 of the handle 10. The free ends of said side portions 11, 12 extend into said openings 20, 21 and are adapted to be securely fastened therein by a pair of rivets 23 passing through a protruding portion 24 on the central portion 16 whereby the lens mount 15 is fixed relative to said handle 10.

Slidably mounted on the intermediate portion of the handle 10 is a lens mount 25, of a size and shape identical with the lens mount 15, and having lens rims 17, 18 spaced apart by the central portion 16 which has the openings 20, 21 therethrough. Since the lens mount 15 is identical in every respect with the lens mount 25, they can be made in the same mould and can be readily interchanged. The mounts 15 and 25 can be made of an inexpensive plastic material that is easily and cheaply moulded. In this way the unit cost of manufacture and assembly of my improved demonstrator can be reduced to a minimum. The side portions 11, 12 of the handle 10 pass through the openings 20, 21 in the central portion 16 of the lens mount 25 so that said lens mount 25 is slidably carried on the handle 10 and is movably mounted relative to and in the plane of the fixed lens mount 15. The side portions 11 and 12 of the handle 10 are adapted to frictionally engage the walls of the openings 20, 21 in the lens mount 25 in either one of two methods. Under the first method, the side portions 11 and 12 can be bowed apart a distance greater than the distance between the openings 20, 21 so that the resilience and spacing of the side portions will cause said side portions 11 and 12 to engage with the outer walls of the openings 20, 21 to resist movement between the mount and the handle. Under the second method, the diameter of the side portions 11, 12 can be made to substantially equal the diameter of the openings 20, 21 so that movement of lens mount 25 relative to the handle 10 will be resisted by the gripping action between the side portions 11, 12 and the walls of the openings 20, 21. The portion 24 of the lens mount 25 projects in the direction of the closed end 13 of the handle 10 so as to provide an instrument of symmetrical and pleasing appearance. The lens mount 25 is adapted to be moved along the handle 10 upon the application of a force sufficient to overcome the friction between the walls of the openings 20, 21 and the side portions 11, 12. The construction of the handle 10 is such that the central portion 16 of the slidable lens mount 25 may engage with the joined end portion 13 to prevent the lens mount 25 from becoming disassembled therefrom.

Fastened with rivets 27 on the central portion 16 of the lens mount 15 and projecting in the direction of the lens mount 25 is a scale member 28 which has an index marker 29 engraved along one edge thereof. Coacting with said member 28 and fastened with rivets 30 on the central portion 16 of the lens mount 25 is a second scale member 31 which has engraved along one edge thereof a set of indicia 32 which is calibrated in millimeters in such a way that the value of the distance between the respective centers of the lens rims 17—17 and 18—18 of the adjacent halves of the lens mounts 15 and 25 will be aligned with the marker 29 so that settings for selected interpupillary distances can be made.

Carried by the adjacent halves of the lens mounts 15, 25, in the lens rims 17—17, is a pair of lenses such as bifocal lenses 33 having segments 34 of a particular style and shape. Carried by the other adjacent halves of the lens mounts in the lens rims 18—18 is another pair of lenses such as bifocal lenses 35 having segments 36 of a different style and shape from segments 34. A person being fitted with bifocal type spectacles may have the two different styles easily and conveniently demonstrated by alternately moving the mating pairs of lenses 33 or 35 in front of his eyes. Th device can also be used to demonstrate the difference between the shades of color in different sunglass lenses for different uses, i. e., the dark shade required for use in open boats as distinguished from the lighter shade required for use in driving a car.

From the foregoing, it will be apparent that I am able to attain the objects of my invention and provide an improved device of the character described. The device is efficient in operation yet simple in structure so that it can be cheaply and easily manufactured. The simple sliding movement of the movable lens mount on the handle enables the user of the device to readily adjust the distance between adjacent lenses so as to provide for different interpupillary distances of different patients. The simplicity of the device is such that it can be easily operated and is unlikely to get out of repair. Various modifications can obviously be made without departing from the spirit of my invention or the scope of the appended claims.

I claim:

1. In a lens demonstrating device the combination of a substantially U-shaped handle, a fixed and a movable lens mount carried by said handle, a pair of lens rims carried by each lens mount and spaced apart by a central portion of each lens mount, each central portion having a pair of parallel, spaced apart openings therethrough lying in the plane of the lens mount, said movable lens mount slidably receiving the side portions of the handle in the openings therein, said fixed lens mount having the open end of the U-shaped handle fastened in said openings therein, the frictional resistance between the movable lens mount and the handle resisting the sliding of the movable lens mount on the handle, and different pairs of lenses mounted in adjacent lens rims of said lens mounts whereby the interpupillary distance between the eyes of a patient may be readily set by slidably moving the movable lens mount along the handle relative to the fixed lens mount.

2. In a lens demonstrating device the combination of a handle having two spaced apart sides joined at one end portion thereof, a pair of lens mounts carried by said handle, a pair of lens rims carried by each lens mount, a central portion of each lens mount being disposed between the lens rims and having a pair of parallel openings therethrough lying in the plane of said lens mount, one of said lens mounts slidably receiving said sides of the handle in the openings therein, said last-named mount being held in adjusted position on the handle by the frictional engagement of the sides with said openings, said other lens mount having the free end portion of the sides of the handle fastened in the openings therein, two different pairs of lenses mounted, respectively, in adjacent lens rims of said lens mounts, an indicator means mounted on one lens mount and projecting in the direction of the other lens mount, and a scale means carried by the other lens mount and coacting with the indicator means for indicating the spacing between the centers of the adjacent lens rims whereby different pairs of lenses may be demonstrated.

References Cited in the file of this patent

UNITED STATES PATENTS

| | | |
|---|---|---|
| 955,333 | Hill | Apr. 19, 1910 |
| 1,204,690 | Ryer | Nov. 14, 1916 |
| 1,481,007 | Herold et al. | Jan. 15, 1924 |
| 1,698,431 | Dunn | Jan. 8, 1929 |